United States Patent [19]

Palmquist

[11] Patent Number: 4,738,508
[45] Date of Patent: Apr. 19, 1988

[54] TERMINATED OPTICAL FIBER AND METHODS OF MAKING

[75] Inventor: John M. Palmquist, Lilburn, Ga.

[73] Assignee: American Telephone and Telegraph Company, AT&T Technologies, Inc., Berkeley Heights, N.J.

[21] Appl. No.: 749,909

[22] Filed: Jun. 28, 1985

[51] Int. Cl.⁴ .............................................. G02B 6/38
[52] U.S. Cl. .............................. 350/96.21; 350/96.20; 350/320
[58] Field of Search .............. 350/96.20, 96.21, 96.22, 350/320; 356/73.1

[56] References Cited

U.S. PATENT DOCUMENTS

| | | | |
|---|---|---|---|
| 3,938,895 | 2/1976 | Bridger et al. | 350/96.20 X |
| 4,057,322 | 11/1977 | Kao | 350/96.29 |
| 4,113,346 | 9/1978 | Jackson et al. | 350/96.20 |
| 4,193,664 | 3/1980 | Ellwood | 350/96.21 |
| 4,203,650 | 5/1980 | Millet et al. | 350/96.21 |
| 4,215,937 | 8/1980 | Borsuk | 356/73.1 |
| 4,240,695 | 12/1980 | Evans | 350/96.21 |
| 4,265,511 | 5/1981 | Nicia et al. | 350/96.20 X |
| 4,289,374 | 9/1981 | Franken et al. | 350/96.20 |
| 4,300,815 | 11/1981 | Malsot et al. | 350/96.20 |
| 4,353,620 | 10/1982 | Schultz | 350/96.21 |
| 4,458,985 | 7/1984 | Balliet et al. | 350/96.21 |
| 4,506,947 | 3/1985 | Tatekura et al. | 350/96.21 |
| 4,545,644 | 10/1985 | DeVeau, Jr. et al. | 350/96.21 |

OTHER PUBLICATIONS

Publications: Y. Kawamura et al. "Optical Connectors for Singlemode Fibers", *Lasers and Applications*, Sep. 1984, beginning at p. 57.

*Primary Examiner*—John Lee
*Attorney, Agent, or Firm*—Edward W. Somers

[57] ABSTRACT

In order to connect two optical fibers (26-26), each of two plugs (40-40) each having a passageway (41) in which is received an optical fiber is mounted in a connector body (42). Each optical fiber comprises a core (25) and a cladding (27). The plugs are destined to be received in a sleeve (75) of a coupler (60) such that their longitudinal axes are coaxial. Alignment of the fiber cores, at least radially of the longitudinal axes, is accomplished by locating for each plug the intersection of a radial line which extends through the centroid of the optical fiber core with the periphery of the plug. An orienting pin is mounted in each connector body in intentional radial alignment with the intersection. The connector bodies are inserted into opposite ends of the coupler sleeve to cause each pin of each connector body to be received in a slot in the coupler. The slots are aligned so that when the connector bodies are inserted into the coupler, the pins orient and cause the plugs to be inserted into the sleeve such that the centroids of the optical fiber cores are aligned along a plane that originates at and extends radially from the longitudinal axes.

21 Claims, 6 Drawing Sheets

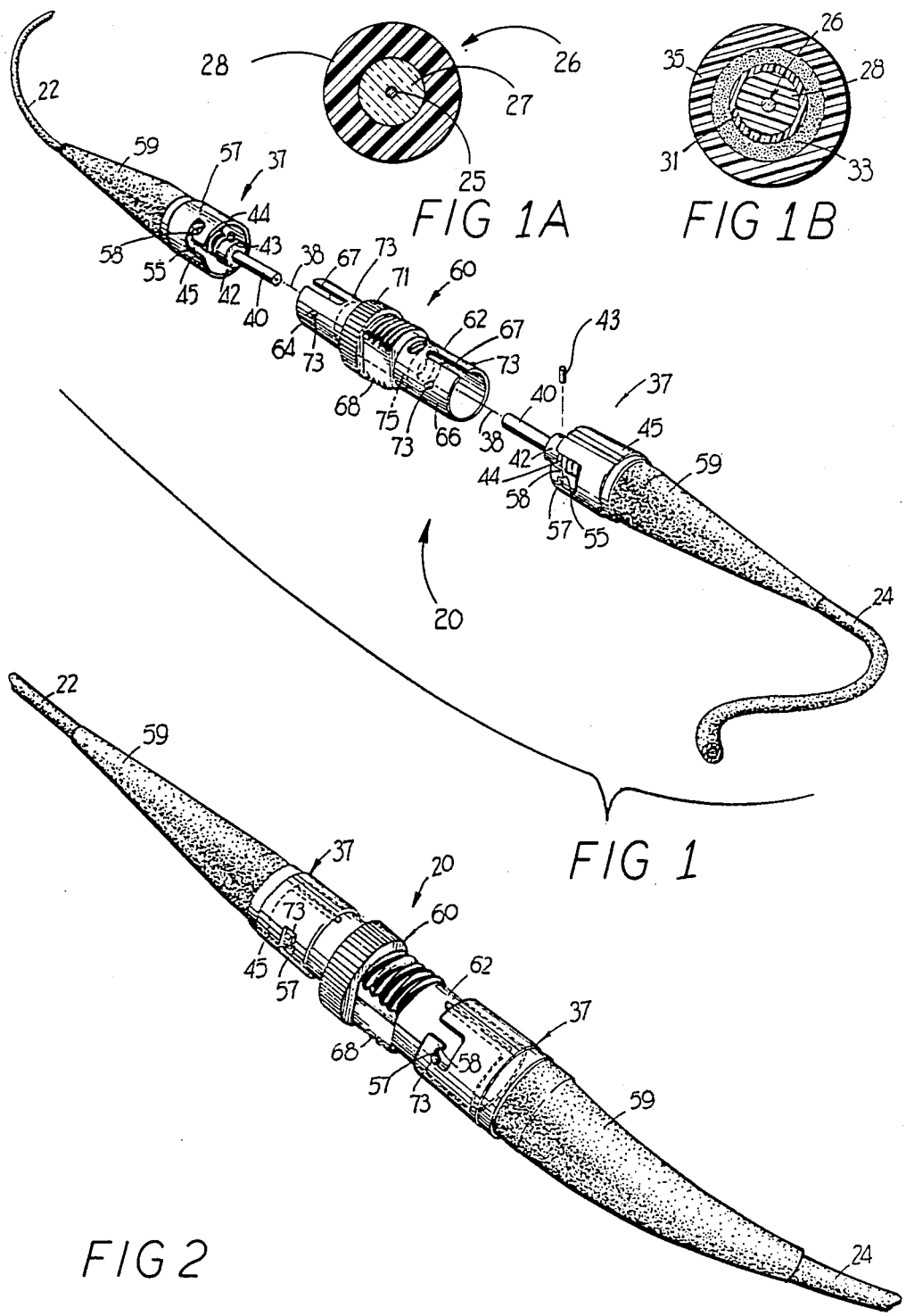

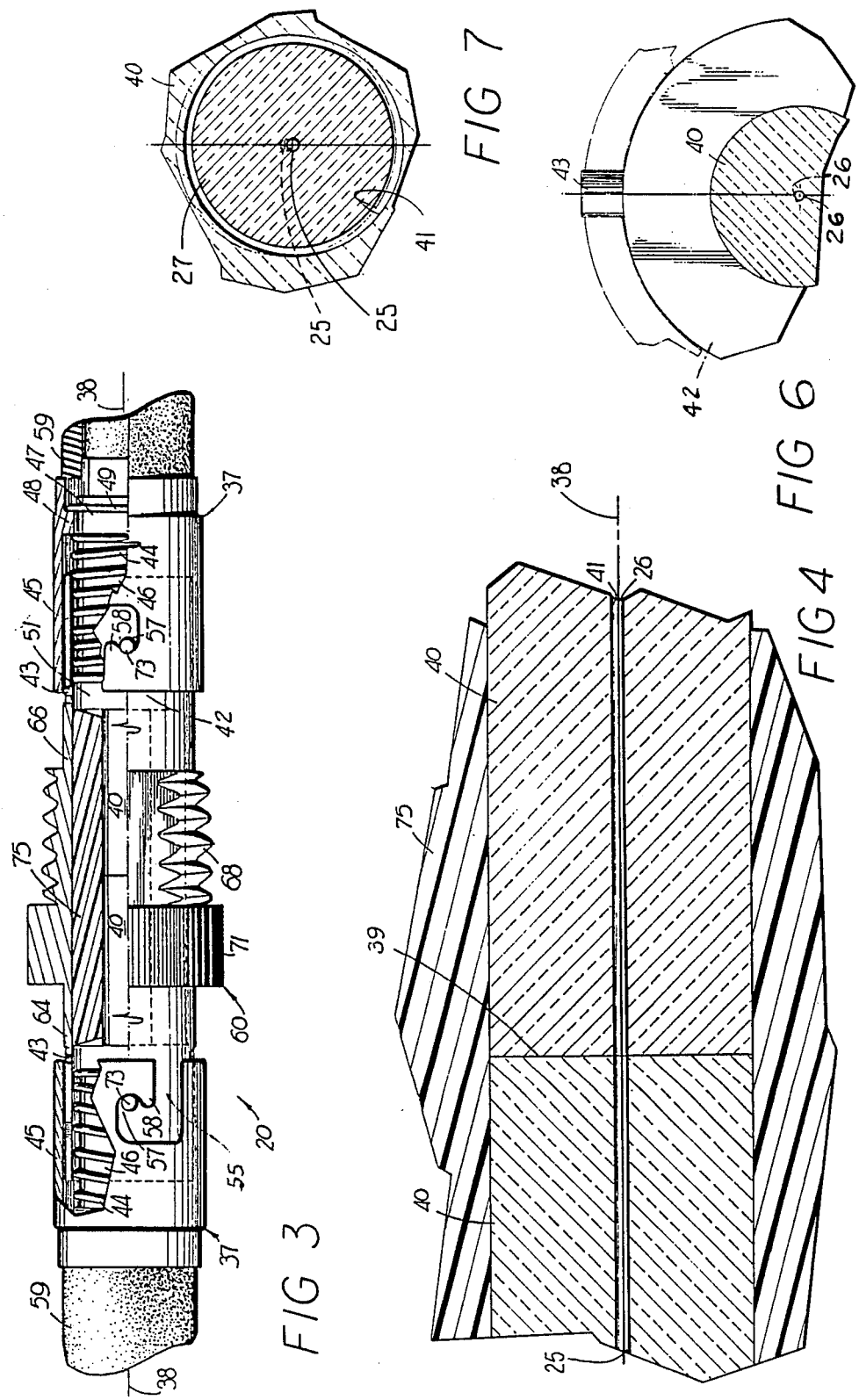

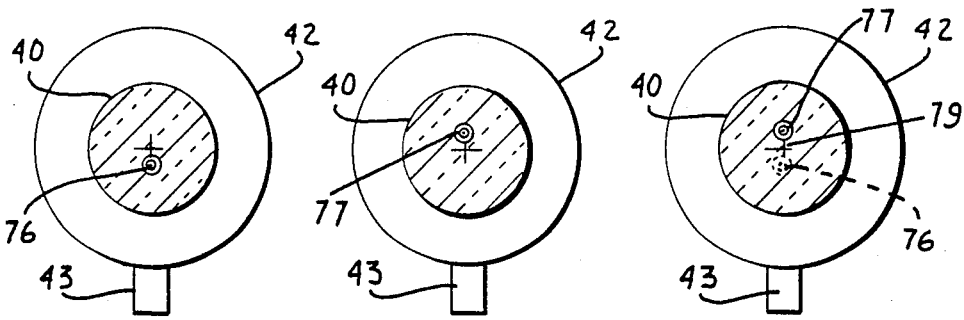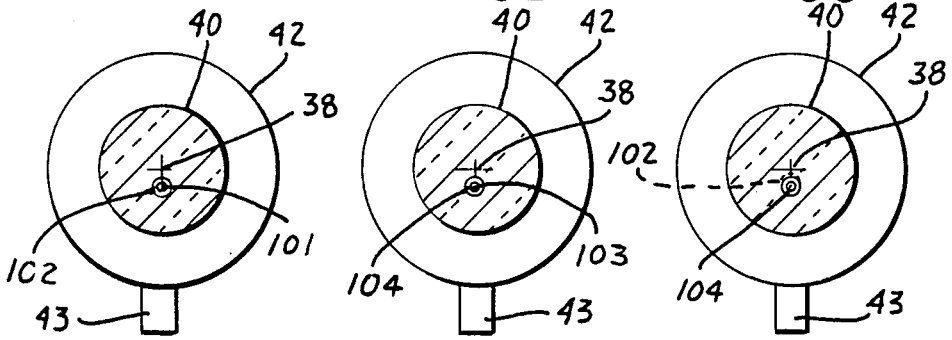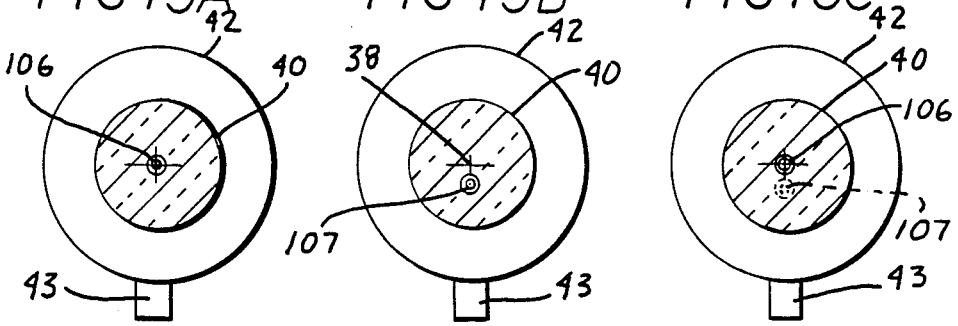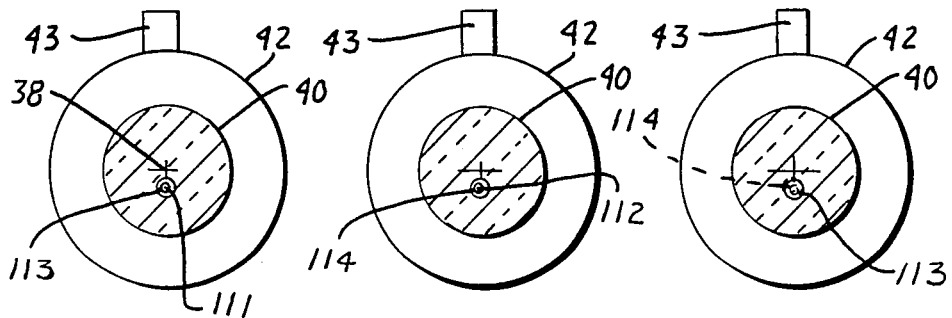

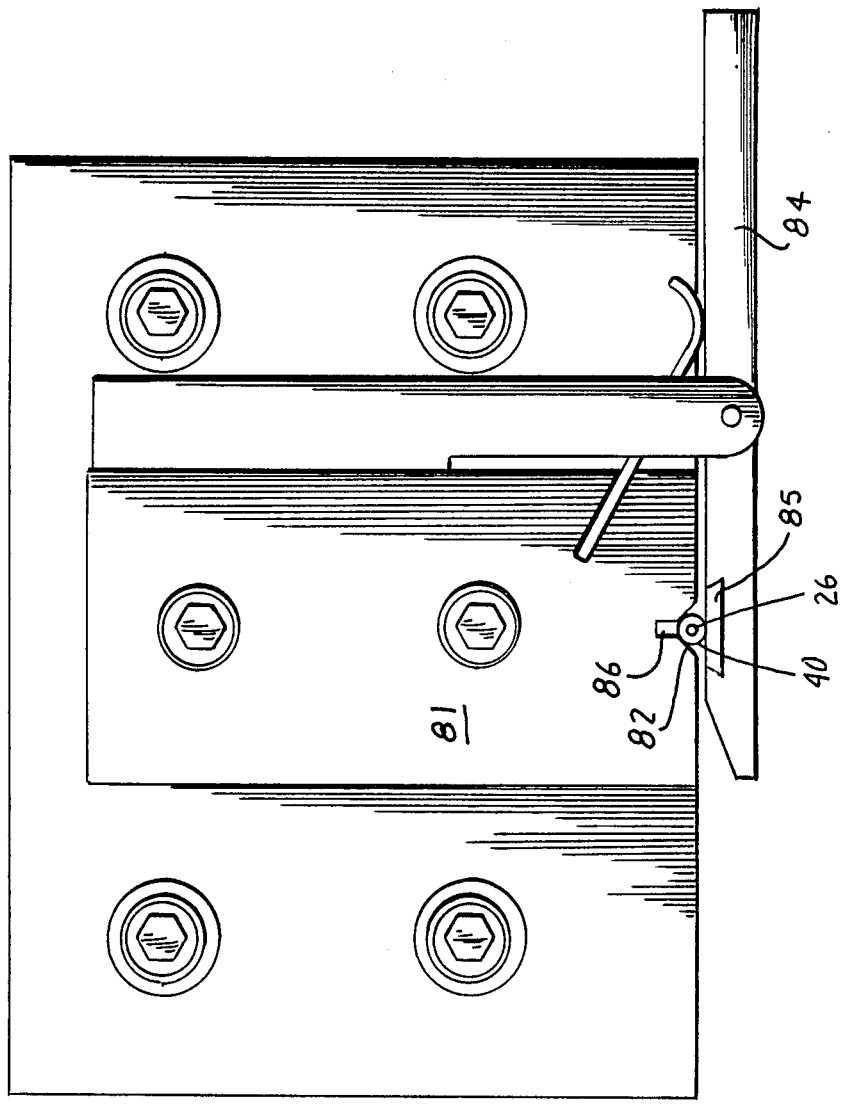

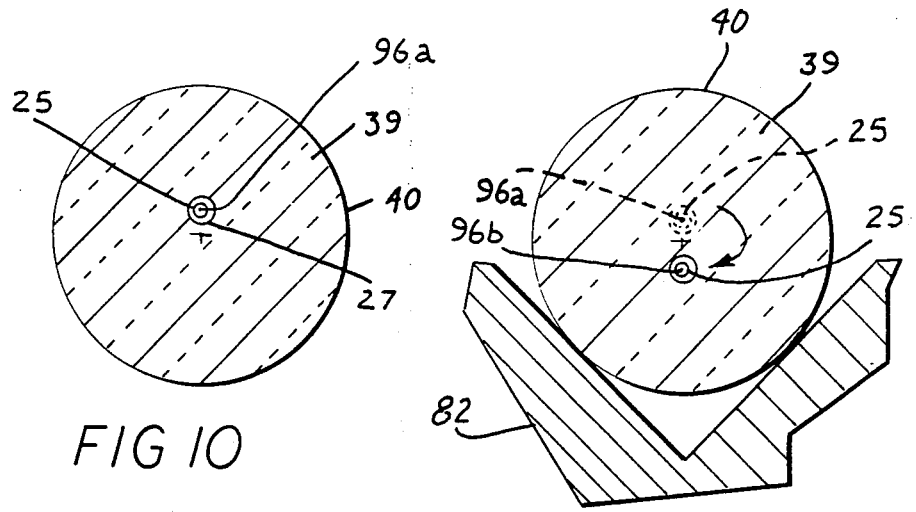
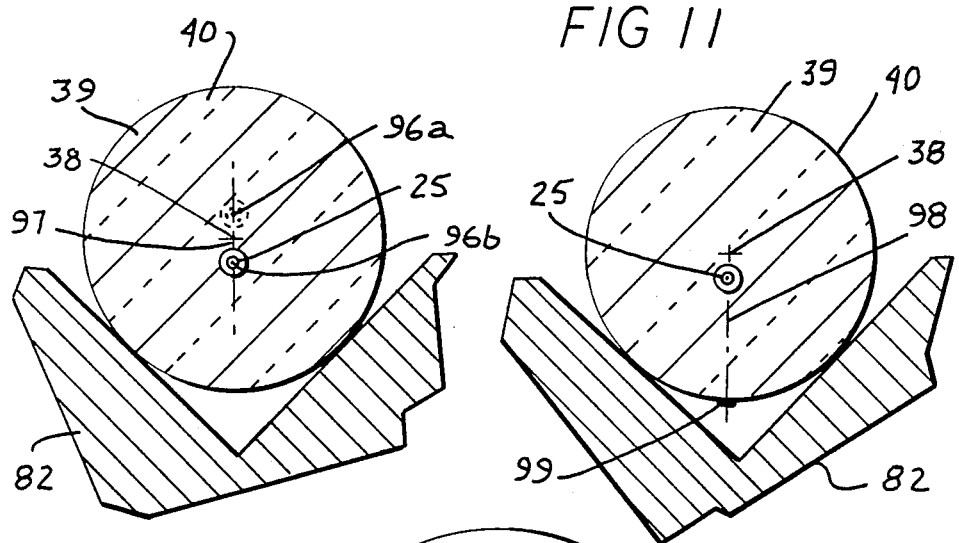
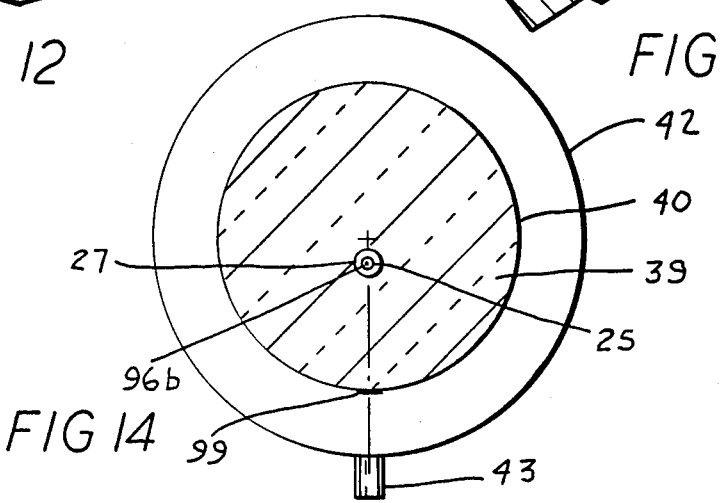

TERMINATED OPTICAL FIBER AND METHODS OF MAKING

TECHNICAL FIELD

This invention relates to a terminated optical fiber and methods of making same. More particularly, this invention relates to methods of causing cores of optical fibers in receiving passageways in coaxial connecting plugs to be disposed in a common plane which extends radially from coaxial longitudinal axes of the plugs to cause the optical fiber cores to be aligned at least radially of the longitudinal axes.

BACKGROUND OF THE INVENTION

An optical fiber used for communications includes a core and a cladding disposed thereabout. Considering the fact that the optical fiber may have an outer diameter of 125 microns over the cladding, the connection of two optical fibers such that their cores in the range of about 8 to 50 microns are aligned is a formidable task. Several connectors are available commercially for establishing a connection between optical fibers.

One connector is referred to as a biconic connector. It includes facilities for holding two plugs each of which terminates an optical fiber and each of which has a conically shaped end portion. The optical fiber end terminates in a pedestal which extends beyond an end face of the plug. Two plugs are received in opposite ends of a sleeve which is mounted in a housing. The sleeve includes opposed, conically shaped cavities for receiving the plugs and for holding them in a manner to cause the end faces of the optical fibers to touch or to be spaced apart slightly. The plugs and the sleeves, which are molded, are controlled such that their mating surfaces cause the optical fibers to become aligned when the plugs are received in the sleeve. In this connector, the plugs are free to be turned about their longitudinal axes. Generally, facilities are not provided for repeated alignment of the plugs with respect to the sleeve.

Another connector is referred to as a ferrule type connector. It includes a coupler having a plug-receiving tubular portion at each end thereof. Each tubular portion is provided with a longitudinally extending slot. A sleeve which floats within the coupler is adapted to receive coaxially two plugs each of which is adapted to terminate an optical fiber. Each plug has a passageway extending longitudinally therethrough for receiving an optical fiber and is mounted in a connector body having an alignment pin projecting radially therefrom. When the connector body is received in a tubular portion of the coupler, the alignment pin is received in the slot which extends along the tubular portion. An assembly pin which projects radially from each tubular portion of the coupler is received in a slot of a housing which encloses the associated plug and connector body and which encloses a tubular portion of the coupler when the plug is assembled to the coupler. The slot in the housing includes a circumferential portion in which the assembly pin of the coupler is received to lock the plug to the coupler.

The ferrule type connector is advantageous in that the plugs are made of a ceramic material and are not molded. As a result, the plugs may be machined with close tolerances which is advantageous when dealing with optical fibers having relatively small dimensions. Further, the passageways in the plugs that are destined to receive the optical fibers are made cleanly without the molding flash which may be expected in other kinds of connectors and which could damage the optical fibers.

Although the floating sleeve in the coupler of the ferrule type connector assures that the outer surfaces of the plugs are aligned, it does not insure that the optical fiber cores in the passageways in the plugs are aligned. The plugs may not be disposed concentrically about the optical fibers. Also, the core may be disposed eccentrically with respect to the cladding. Further, misalignment between the cores is caused by the clearance between the optical fibers and the plug passageways in which they are received. Of course, if the fiber cores in the passageways are not aligned, transmission losses ensue. The alignment of the cores is especially critical in connecting single mode fibers wherein the cores typically have a diameter on the order of 8 microns.

The prior art includes a connector system having positioning tabs which assure the same radial orientation of the ends of the optical fibers after repeated couplings. This insures that the fiber ends after disconnecting and reconnecting are always coupled together with the same orientation as before disconnection, but it does not provide for optimal alignment of the optical fiber cores in the first instance.

For field termination of optical fibers, the methods disclosed in commonly assigned application Ser. No. 739,800 filed on May 31, 1985 in the name of J. M. Palmquist are acceptable. Plugs are assembled to connector bodies such that the centroid of the passageway of each plug is aligned radially with the pin of its associated connector body. When optical fibers are terminated with such a plug assembly, the passageways in which the optical fibers are received are aligned with the pins and then with each other when the plugs are received in a coupler. However, for factory termination, more precise methods are sought to insure that the optical fiber cores are aligned.

The need for core alignment has been addressed by the prior art. For example, optimal alignment may be achieved by a trial and error process which involves testing for each iteration of the process. Also, in the biconic connector, referred to hereinbefore, methods and apparatus have been used to abrade the exterior of the biconical plug to remove material therefrom to cause the fiber core of the optical fiber received therein to be disposed concentrically with respect to the exterior surface of the plug. Then, when the plugs are received in a sleeve, the fiber cores are aligned substantially. There is a counterpart of this technique for ferrule type connectors. However, these techniques require precision grinding and generally are expensive.

What is needed and what is not provided by the prior art is a ferrule type system for connecting optical fibers in which provisions are made for causing the optical fiber cores to be aligned optimally. A solution to the problem should be one which is relatively inexpensive to carry out, should be one which is compatible with the presently available ferrule type connectors, and should be one which can be accomplished without iterative testing at the time of installation by the user.

SUMMARY OF THE INVENTION

The foregoing problem has been overcome by a terminated optical fiber of this invention and the methods of making same. The terminated optical fiber includes a plug having a longitudinal axis and a longitudinally extending passageway. The passageway is adapted to receive an end portion of an optical fiber which includes a core and a cladding disposed thereabout. In a preferred embodiment, the terminated optical fiber includes a connector body in which the plug is mounted. Orienting facilities are associated with the plug by being provided in the connector body in intentional alignment with a line which extends radially through the longitudinal axis of the plug and through a centroid of the optical fiber core in an end face of the plug. In this application, centroid of the core is defined as the center of mass of a thin, uniform plate having the same periphery as a transverse cross-section of the fiber core and being adjacent to the plug end face.

An optical fiber connection is made with two of the above described plugs and connector bodies. The orienting facilities of each terminated optical fiber include a radially projecting pin. A coupler is provided for causing the plugs to be supported with the longitudinal axes of the plugs being coaxial and for holding the pins of the connector bodies to cause the radially extending lines of the plugs to be disposed in a common plane which originates at and extends radially from the longitudinal axes. As a result, the centroids of the optical fiber cores in the plug passageways become disposed substantially in the common plane and the cores of the optical fibers are aligned substantially.

More specifically, an end portion of an optical fiber is inserted into a passageway of a first plug having a longitudinal axis and an end portion of another optical fiber is inserted into the passageway of a second plug. Each of the plugs is mounted in a connector body. Then a centroid of the optical fiber core in the passageway in the first plug and of one in the second plug each are located in an end face which is transverse to a longitudinal axis of each plug. Then each plug is caused to be rotated about its longitudinal axis through an angle of 180°. The centroids of the optical fiber core in each plug end face again is located. Using the centroids of the cores in the original and in the rotated positions, the longitudinal axis of each plug is located. Then, for each plug, there is located the intersection of a radial line, which extends from the longitudinal axis, and the periphery of the plug. The radial line of each plug passes through the location of the centroid of the rotated position of the core such that the centroid of the core in the rotated position is disposed between the intersection and the longitudinal axis of the plug. An orienting pin is then installed in the connector body associated with the first plug such that the pin is aligned with the intersection. The second plug is assembled in a similar fashion with a pin installed in the associated connector body. Then the plugs are mounted in a sleeve of a coupler such that the longitudinal axes of the plugs are coaxial and such that the pins of the connector bodies are oriented to cause the centroids of the optical fiber cores in the first and second plugs to be disposed in a common plane which originates at and which extends radially from the coaxial longitudinal axes of the plugs.

BRIEF DESCRIPTION OF THE DRAWINGS

Other features of the present invention will be more readily understood from the following detailed description of specific embodiments thereof when read in conjunction with the accompanying drawings, in which:

FIG. 1 is an exploded perspective view of an optical fiber connection arrangement which includes two terminated optical fibers of this invention;

FIG. 1A is an end cross-sectional view of an optical fiber which includes a core and a cladding;

FIG. 1B is an end cross-sectional view of an optical fiber cable;

FIG. 2 is a perspective view of the optical fiber connection arrangement of FIG. 1 as assembled;

FIG. 3 is an elevational view partially in section of the connection arrangement of FIG. 2;

FIG. 4 is an enlarged elevational view of two plugs of the connection arrangement of FIG. 3;

FIGS. 5A–5C are a sequence of views which show a prior art method of aligning fibers in two plugs with distances from longitudinal axes of plugs to centroids of plug passageways being exaggerated for purposes of clarity;

FIG. 6 is an end view in section of a portion of the connection arrangement of FIG. 3 showing optical fibers which are received in the plugs;

FIG. 7 is an enlarged end view of passageways of the two plugs of FIG. 4 with optical fibers installed therein and with the cores thereof and plug passageways being offset;

FIG. 9 is a plan view of a portion of the apparatus of FIG. 8;

FIGS. 10–14 are a sequence of views to illustrate steps of the inventive method for causing alignment of optical fiber cores in plugs with distances from longitudinal axes of the plugs to centroids of the cores being exaggerated for purposes of clarity;

FIGS. 15A–15C and 16A–16C show the alignment of fiber cores in passageways in accordance with this invention with distances from longitudinal axes of plugs to centroids of the cores being exaggerated for purposes of clarity; and FIGS. 17A–17C illustrate an alternative embodiment of the invention with distances from longitudinal axes of plugs to centroids of the optical fiber cores being exaggerated for purposes of clarity.

DETAILED DESCRIPTION

Figure 8:
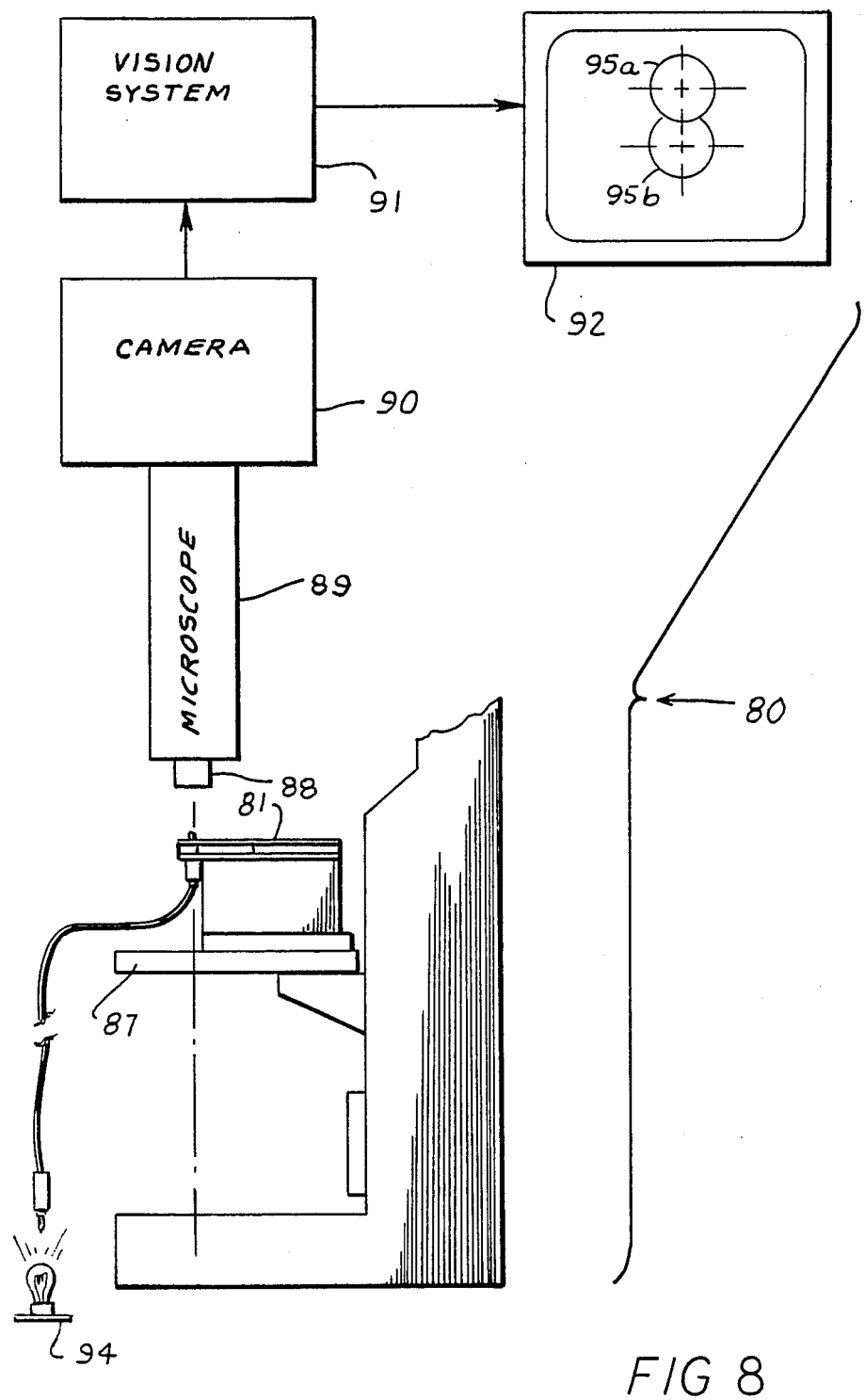
FIG. 8 is a schematic view of an apparatus which is used to locate the centroid of the core of an optical fiber which is terminated by a plug and a connector body.

Referring now to FIGS. 1 and 2 there is shown an optical fiber connector 20 for providing an optical fiber connection between an optical fiber cable 22 and an optical fiber cable 24. Each of the optical fiber cables 22 and 24 includes a single optical fiber 26 (see FIG. 1A) having a core 25 and a cladding 27 enclosed in a coating 28 and having a tube 31 of polyvinyl chloride (PVC) extruded thereabout (see FIG. 1B). Covering the tube 31 of PVC is a strength member 33 such as one made of Kevlar ® fibrous material, for example, and an outer jacket 35 which may be comprised of PVC.

Referring to FIGS. 1–4, it can be seen that the connector 20 comprises two optical fiber terminations, each designated generally by the numeral 37. Corresponding elements of the terminations 37—37 are identified with the same numerals. The connector 20 is such that longitudinal axes 38—38 of the terminations are coaxial. In addition to an end portion of an optical fiber 26, each termination 37 comprises an optical fiber terminus or plug 40, having a passageway 41 (see FIG. 4) and being made of a ceramic material. The plug 40 has an outer diameter of about 2500 microns. An end face 39 of the plug 40 includes an opening of the passageway 41.

The coating 28, as well as the tube 31, strength member 33 and outer jacket 35, is removed from an end portion of an optical fiber 26 prior to its termination with a plug 40. Then the end portion of the optical fiber 26 is inserted into the passageway 41 of each plug 40 such that the end face of the optical fiber extends slightly beyond the end face 39 of the plug. The bared optical fiber has an outer diameter of 125 microns whereas the diameter of the passageway 41 is about 127 microns. Then the end portion of the optical fiber 26 is secured within the passageway 41 of the plug 40 and the end faces of the optical fiber and of the plug are ground and polished.

Each termination also includes a connector body 42 made of a plastic or metallic material, a compression spring 44 and a tubular housing 45 made of a metallic material. It should be observed that the plug 40, the connector body 42 and the housing 45 each have a cylindrical cross-section. The connector body 42 includes a separate orienting pin 43 which can be installed at any of an infinite number of positions in accordance with this invention and which projects radially from the longitudinal axis 38.

The connector body 42 includes a smaller diameter portion 46 (see FIG. 3) which extends through an opening 47 in an internally disposed collar 48 in the housing. A retaining washer 49 circumscribes the smaller diameter portion on the outer side of the collar. The spring 44 is disposed about the smaller diameter portion 46 of the connector body 42 between the collar and a large diameter portion 51. As a result of this arrangement, the spring 44 biases the connector body 42 outwardly from the cable to hold the connector body within the housing 45.

Viewing again FIG. 1, it can be seen that the housing 45 includes a longitudinally extending slot 55 which at its inner end communicates with a circumferentially extending slot 57. The slot 57 is formed so that the tubular wall of the housing which defines it includes a latching projection 58. These slots 55 and 57 are used for securing a termination 37 to another portion of the connector 20.

Completing the connector termination 37, there is shown a portion 59 which extends from the housing 45 along the optical fiber cable in a conically shaped configuration until it assumes the general cross-section of the cable. This portion of the connector 20 provides strain relief for the termination and insures that the cable can withstand repeated bends in use after interconnection with another cable without undue stresses being imparted to the optical fibers.

Each of the connector bodies 42—42 and termini or plugs 40—40 is adapted to be received in a coupler designated generally by the numeral 60. The coupler 60 includes a tubular member 62 having end portions 64 and 66 with each end portion including a longitudinally extending slot 67. In order to allow the connector 20 to be panel-mountable, the coupler 60 includes a center portion 68 which is threaded and which is adapted to be inserted in a hole (not shown) in a panel. A nut 71 is turned thereonto to secure the coupler to the panel. Also included in the coupler 60 at each end portion 64 and 66 thereof are assembly pins 73—73 which are displaced circumferentially from the slot 67 at that end.

In assembling the connector 20 which is shown in FIGS. 1 and 3, an installer panel-mounts the coupler 60 or otherwise positions it to receive the terminations 37—37. Mounted within the coupler 60 is a sleeve 75 (see also FIG. 4). The sleeve 75 is adapted to receive the plugs 40—40 of the terminations 37—37 and is a means for aligning the outer surfaces of the plugs. The sleeve 75 is disposed within the coupler 60 such that it floats to allow for some movement of the plugs 40—40 when they are inserted into the coupler. Further, the sleeve 75 causes the longitudinal axes 38—38 of the plugs 40—40 mounted therein to be coaxial.

The installer, in assembling the connector 20, inserts the plug 40 of one of the terminations 37—37 into the sleeve 75 with the pin 73 of the coupler being received in the longitudinally extending slot 55 of the termination. At the same time, the installer has caused the pin 43 which extends radially from the connector body 42 of the one termination 37 to be received in a longitudinal slot 67 of the coupler 60. The movement of the plug 40 is discontinued when the pin 43 engages an inner end of the wall which defines the slot 67. Continued movement of the housing 45 against the bias of the spring 44 causes the housing to override the connector body. When the pin 73 at the one end of the coupler 60 reaches an inner end of the longitudinally extending slot 55, the operator turns the housing 45 to cause the pin 73 to become disposed and secured within the circumferentially extending slot 57 behind the latching portion 58 (see FIG. 3). It should be observed that the housing 45 is free to turn about the plug 40 and its associated connector body 42. This allows the housing 45 to be turned independently of the connector body 42 to cause the pin 73 to become disposed behind the latching portion 58.

After these steps, the installer repeats the procedure with respect to the other termination 37 to cause the plug 40 thereof to be received within the floating sleeve 75. It should be observed that because of dual pins at each end of the coupler 60, either end may be inserted into a panel. The geometries of the coupler 60 and of the terminations 37—37 are such that when the plugs 40—40 are received within the floating sleeve 75, and the pins 43—43 bottomed out in the slots 67—67 of the coupler 60, end faces of the plugs 40—40 abut each other (see FIGS. 3 and 4). As a result, transmission losses through the connector 20 are minimized.

In order to insure that the transmission losses are further minimized, it is incumbent upon the manufacturer of the connector 20 to insure that the cores 25—25 of the optical fibers 26—26 which are secured within the passageways 41—41 of the plugs 40—40 become aligned optimally as a result of the connection process. The methods of this invention reduce the distance by which the centroids of the optical fiber cores are offset from each other with prior art techniques. Referring now to FIG. 5, it can be seen that without the methods of this invention it is possible to have the centroid of one core 76 (see FIG. 5A) in one plug 40 and that of a core 77 (see FIG. 5B) in another plug disposed along oppositely extending radii. It should be appreciated that the connector bodies 42—42 and pins 43—43 are shown in FIG. 5 to relate the orientation of the optical fibers thereto. It has been determined that the centroid of each passageway in a production plug might lie as much as perhaps 3 microns from the longitudinal axis of its associated plug. Although the passageways in FIG. 5 are disposed along a diametrical line 79, they are on diametrically opposite sides of a longitudinal axis of the plugs 40—40 and may have their centroids spaced apart as much as 6 microns when the plugs are assembled in a sleeve 75 (see FIG. 5C). Also, because the fiber cores 25—25 may be disposed eccentrically with respect to the claddings by as much as 1 micron, there is a potential for another 2 microns of offset when two fibers are connected. Further, the passageways in the plugs have a clearance of one micron about the clad fibers. This also adds to the potential misalignment between the cores. The worst offset under these conditions may be as much as 10 microns.

The optimal alignment of the optical fibers 26—26 is accomplished by the methods and devices of this invention which rely on a predetermined orientation of the optical fiber cores 25—25 with respect to the pins 43—43 extending from the connector bodies 42—42. More specifically, the methods of this invention include the location and machine vision marking or other suitable marking of the radial orientation of the fiber cores 25—25 which extend through the plugs 40—40 with respect to a longitudinal axis of the connector and their alignment in a particular manner to insure that the optical fiber cores 25—25 are aligned (see FIG. 6) at least radially. Such a technique results in the cores being offset no more than 5 microns. Of course, improvements in tolerances for eccentricities of passageways, core-to-cladding eccentricity of fibers and cladding-to-passageway clearance reduce this worst case offset substantially. An enlarged view of how the cores 25—25 and passageways 41—41 may overlap while being aligned in a radial direction is shown in FIG. 7.

An apparatus 80 (see FIG. 8) is used to assembly a pin 43 with a connector body 42 in accordance with this invention to cause the pin to be aligned with the centroid of the core 25 of an optical fiber 26 in a passageway 41. Referring now to FIG. 9, there is shown a base 81 having a V-shaped support trough 82 formed therein. Extending across the trough 82 is an arm 84 having a bearing pad 85 made of TEFLON ® plastic, for example, mounted thereon. The bearing pad is adapted to engage the outer surface of a plug 40 which is positioned in the trough 82 for core location. The base 81 also includes a relief slot 86 which opens to the trough 82.

The base 81 is supported on a moveable stage 87 which is adapted to be moved in the vertical coordinate direction to cause the end face of the optical fiber 26 terminated by the plug 40 held in the trough 82 to be aligned with and in the focal plane of an objective 88 of a microscope 89 (see FIG. 8). An eyepiece of the microscope is adapted to be viewed by a television camera 90 which is connected to a machine vision system 91. The machine vision system provides an input to a monitor screen 92. The machine vision system 91 also is used to calculate the position of the centroid of the optical fiber core for a given orientation of the plug 40. A light source 94 is positioned to illuminate the core 25 of the optical fiber held in the trough 82.

In a first step of the process, each plug 40 having an end portion of an optical fiber 26 secured within its passageway 41 as described hereinbefore is caused to be disposed within the V-shaped support trough 82 (see FIG. 9), for example, and appropriate facilities used in order to locate centroid 96a (see FIG. 10) of the core 25 in the end face 39 of the plug. The core 25 is illuminated by the source 94 and the microscope is focused. An image 95a (see FIG. 8) of the core 25 which is seen in the monitor 92 is processed by the machine vision system, and the centroid of the core is calculated electronically. Hence, the apparatus 80 is used to record the location 96a adjacent to the end face of the plug 40 at an initial location.

It should be understood that although the fiber cores and the plugs in FIGS. 10-17 are approximately to relative scale, the displacement of the cores with respect to the longitudinal axes of the plugs is not. It will be recalled that the diameter of the plug is about 2500 microns, the diameter of the passageway is about 127 microns, the diameter of the clad fiber is 125 microns, and the diameter of the core is 8 to 50 microns. Also, the maximum distance by which the centroid of the core is offset from the longitudinal axis 38 in a production plug 40 is 5 microns. The displacement, which is more accurately depicted in FIG. 7, is exaggerated in FIGS. 10-17 in order to more clearly depict the alignment steps of this invention.

Then the plug 40 within the support 82 is caused to be turned through an angle of 180° (see FIG. 11) to locate the centroid of the core 25 in the rotated position of the core. The image of the core in its rotated position on the monitor is designated 95b (see FIG. 8). In the rotated position, the centroid of the core 25 is designated 96b. The location 96b adjacent to the end face of the plug 40 and after rotation is recorded. It should be understood that although the core locations in FIGS. 10-14 and in ensuing figures are depicted along a vertical axis, they may be at any radial position about an end face of the plug 40. Next, a line 97 (see FIG. 12) is caused to be extended between the centroid of the initial position of the core 25 as the plug 40 is supported within the trough 82 and the centroid 96b of the final location of the core. A center of the end face of the plug 40 through which extends the longitudinal axis 38 of the plug 80 is determined between the centroids of the core locations 96a and 96b. Then, a radial line 98 (see FIG. 13) is extended from the center through the centroid 96b of the core 25 in its rotated position to intersect the periphery of the plug 40 at a location designated 99. The intersection 99 is in radial alignment with the second location of the core 25 of the plug.

The intersection 99 may take several forms. It may comprise an inked mark or it simply may be a reference point which provides an indication of an angle by which the radial line 98 is displaced from a reference coordinate axis of the end face of the plug 40. In the preferred embodiment, the intersection 99 adjacent to the periphery of the plug 40 is made such that the core 25 always is positioned in a particular way relative to the intersection and the longitudinal axis 38 of the plug. The core 25 is disposed either at the longitudinal axis 38 of the plug 40 or between the longitudinal axis 38 and the intersection 99 adjacent to the periphery thereof.

Then the plug assembly is moved into another fixture (not shown) and turned until its location 99 is caused to be aligned with a drill. A hole is provided in the connector body 42. Then the pin 43 is assembled with and secured to the connector body 42 such that the intersection 99 on the periphery of the plug is aligned with the pin 43 on the connector body (see FIG. 14). Of course, it is understood that it is the radially extending centerline of the pin 43 which is aligned with the intersection 99 and hence with the core centroid.

It should be clear that arrangements other than pins may be used. For example, the connector body may be provided with a depression or dimple in alignment with the centroid of the optical fiber core of the associated plug. The coupler is provided with an internally projecting lug which becomes disposed in the depression of the connector body when the plug 40 is inserted into the sleeve 75.

This procedure is repeated for each termination 37. Each termination 37 includes a terminated optical fiber 26 received in a passageway 41 in which the centroid of the fiber core 25 is aligned intentionally with a pin 43 extending radially from the connector body 42 thereof. It should be noted that all terminations 37—37 are assembled in exactly the same way thereby rendering them interchangeable for mounting in the coupler 60. The plugs 40—40 are inserted into the sleeve 75 such that the end faces 39—39, in which the centroids of the fiber cores have been determined, are adjacent to each other.

It can be seen that each of the plugs 40—40 terminates an optical fiber 26 the core 25 of which is aligned radially with the pin 43 of the connector body 42 in which the plug is received. As will be recalled, the pin 43 of each termination 37 is received in one of the slots 67—67 when the termination is assembled to the coupler 60. As a result, the optical fiber cores 25—25 of plugs 40—40 which are mounted in a coupler 60 are always aligned in a plane which originates at the coaxial longitudinal axes 38—38 and which extends radially thereof through the slots 67—67 which themselves are aligned.

Advantageously, with the methods of this invention, the offset distance by which the core centroids are separated is minimized. Applying the methods of this invention, it can be seen from FIG. 15 that centroids of cores are caused to be disposed in a common radial plane and on the same side of the longitudinal axes. Centroid 101 of a core 102 (see FIG. 15A) of one plug 40 is caused to be aligned with a pin 43 and disposed between the pin and the longitudinal axis 38 of the plug. Similarly, the centroid 103 of a core 104 (see FIG. 15B) of another plug is caused to be aligned with a pin 43 and disposed between the pin and the longitudinal axis of that plug. Then the connector bodies 42—42 are assembled to the sleeve within the coupler 60 in a way to cause the pins 43—43 to be aligned in a common radial plane which originates at and extends from the coaxial longitudinal axes 38—38. As a result, in many instances, the fiber cores, although offset from the longitudinal axes, are not only disposed in a common plane but are aligned substantially longitudinally (see FIG. 15C). Inasmuch as it has been determined that the offset of the centroid of a core 25 from the longitudinal axis of a plug 40 does not exceed 5 microns, this technique reduces the offset of cores 25—25 of plugs mounted in a sleeve 75 to a distance not greater than 5 microns. Again, improvements in component part tolerances and clearances will reduce substantially this worst case offset.

As shown in FIG. 16, the centroid of one core 106 may be coincident with the longitudinal axis 38 of the plug 40, and another 107, disposed between the longitudinal axis 38 of its plug and the plug periphery. Otherwise, the centroids of the cores of both plugs are disposed between the longitudinal axes 38—38 and the peripheries of the plugs as shown in FIG. 15C.

Although the preferred embodiment has been described always to have the centroids of the plug cores coincident with the longitudinal axes 38—38 of the plugs 40—40 or disposed between the longitudinal axes and the pins 43—43 of the connector bodies 42—42, this is not necessary. For example, as shown in FIG. 17, the orienting process is carried out so that the longitudinal axes 38—38 of the plugs 40—40 become disposed between the associated pins 43—43 and centroids 111 and 112 of cores 113 and 114. As in the preferred embodiment, all plugs 40—40 are oriented in the same manner and assembled with a connector body in the same way.

It should be understood that the above-described arrangements are simply illustrative of the invention. Other arrangements may be devised by those skilled in the art which will embody the principles of the invention and fall within the scope and spirit thereof.

What is claimed is:

1. A terminated optical fiber, which comprises:
  a plug which includes a longitudinal axis and a longitudinally extending passageway;
  an optical fiber which includes a core and a cladding that encloses said core and which includes an end portion that is received within said passageway; and
  orienting means associated with said plug in intentional predetermined orientation with respect to a line which extends radially through the longitudinal axis of the plug and through a centroid of the optical fiber core so that when said plug and a plug of another said terminated optical fiber are supported with the longitudinal axes thereof being coaxial, the orienting means are adapted to be held to orient the radially extending lines of the plugs in a common plane which originates at and extends radially from the longitudinal axes to cause the centroids of the cores of the terminated optical fibers to be disposed in the common plane.

2. A terminated optical fiber, which comprises:
  a plug which includes a longitudinal axis and a longitudinally extending passageway;
  an optical fiber which comprises a core and a cladding disposed about said core and which includes an end portion that is disposed within said passageway; and
  a connector body in which is mounted said plug and which includes orienting means caused to be disposed in intentional alignment with a line which extends radially through the longitudinal axis of the plug and through a centroid of the optical fiber core, said connector body and said plug adapted to be received in one end of a coupler and a connector body and plug of another terminated optical fiber adapted to be received in the other end of the coupler with the longitudinal axes of the plugs being coaxial and said orienting means of each connector body being disposed in a common plane which originates at and extends radially from the longitudinal axes to cause the centroids of the cores of the optical fibers terminated by the plugs and connector bodies received in the coupler to be disposed substantially in the common plane.

3. A terminated optical fiber cable, comprising:
  a plug which includes a longitudinal axis and a longitudinally extending passageway;
  an optical fiber cable comprising an optical fiber having an end portion which is disposed in the passageway of said plug, said optical fiber including a core and a cladding disposed about the core; and
  a connector body in which is mounted said plug and including a pin extending radially from the longitudinal axis of said plug and being mounted in said connector body to cause said pin to be aligned intentionally with the centroid of the optical fiber core in an end face of the plug along a radial line which extends from the longitudinal axis of the plug through the centroid, said connector body and said plug adapted to be received in one end of a coupler and the connector body and plug of another terminated optical fiber cable adapted to be received in the other end of said coupler such that the longitudinal axes of the plugs are coaxial and the pins of the connector bodies supported by the coupler so that the radially extending lines are disposed in a common plane which extends radially from the coaxial longitudinal axes of said plugs to cause the centroids of the cores of the optical fibers to be disposed substantially in the common plane.

4. The terminated optical fiber cable of claim 3, wherein the coupler includes a sleeve and each of the plugs is adapted to be received in the sleeve, and wherein each of the connector bodies is enclosed in a housing, each said housing including a longitudinally extending slot connected at its inner end to a circumferential slot and wherein the coupler includes a radially projecting assembly pin at each end thereof, each pin of the coupler adapted to be received in a slot of a housing when the connector body enclosed by said housing is received in the coupler.

5. The terminated optical fiber cable of claim 3, wherein the coupler includes a longitudinally extending slot of each end thereof with the slots being aligned longitudinally, the pin of each connector body adapted to be received in a slot of the coupler when the connector body is received in the coupler.

6. The terminated optical fiber cable of claim 3, wherein the core centroid is disposed between the longitudinal axis of said plug and said pin.

7. The terminated optical fiber cable of claim 3, wherein the longitudinal axis of said plug is disposed between the core centroid and said pin.

8. An optical fiber interconnection system, which comprises:
first and second terminated optical fiber cables each of which includes:
an optical fiber cable which includes an optical fiber, comprising a core and a cladding disposed about the core, and a sheath system which encloses said optical fiber, an end portion of said cable having said sheath system removed therefrom to expose an end portion of said optical fiber;
a plug which includes a longitudinal axis and a longitudinally extending passageway with said end portion of said optical fiber being disposed in said passageway; and
a connector body in which is mounted said plug and including a pin extending radially from the longitudinal axis of said plug, said pin being mounted in said connector body to cause said pin to be aligned intentionally with the centroid of the fiber core in an end face of the plug along a radial line which extends from the longitudinal axis of the plug; and
a coupler including a tubular member adapted to receive a connector body in each end thereof and a sleeve which is disposed within said tubular member and which is adapted to receive a plug in each end thereof such that the longitudinal axes of the plugs are coaxial, said tubular member including a longitudinally extending slot in each end thereof with said slots being aligned and being adapted to receive said pins of said connector bodies when said plugs are moved into said sleeve to cause said optical fiber cores to be aligned radially of the longitudinal axes.

9. An optical fiber connection, which includes:
first and second plugs each of which includes a longitudinal axis and a passageway extending longitudinally therethrough and being adapted to receive an optical fiber;
an optical fiber disposed in the passageway of the first plug and an optical fiber disposed in the passageway of the second plug with the end face of each optical fiber extending to an end face of its associated plug, each of the optical fibers including a core and a cladding disposed about said core;
a first connector body in which is mounted said first plug, said first connector body including orienting means aligned intentionally with a line which extends radially from the longitudinal axis of said first plug through the centroid of the optical fiber core in the end face of the first plug;
a second connector body in which is mounted said second plug, said second connector body including orienting means aligned intentionally with a line which extends radially from the longitudinal axis of said second plug through the centroid of the optical fiber core in the end face of the second plug; and
a coupler in which are received said first and second plugs with the longitudinal axes thereof being coaxial and with the end faces of the plugs being adjacent to each other, said coupler including means for holding the orienting means of said first and second connector bodies to cause the centroids of the optical fiber cores to be disposed in a common plane which originates at the longitudinal axes and which extends radially therefrom.

10. The connection of claim 9, wherein each of said plugs is received in a sleeve which is disposed in said coupler.

11. The connection of claim 9, wherein each of said connector bodies is enclosed in a housing, each said housing including a longitudinally extending slot connected at its inner end to a circumferential slot and wherein said coupler includes a radially projecting pin at each end thereof, each said pin of said coupler adapted to be received in a slot of a housing when the connector body secured to said housing is received in said coupler.

12. The connection of claim 9, wherein said holding means of said coupler includes a longitudinally extending slot at each end thereof with the slots being aligned longitudinally.

13. The connection of claim 12, wherein said orienting means of each of said connector bodies includes a radially projecting pin, said pin of each said connector body being received in one of the slots of said coupler when said connector body is received in said coupler.

14. A method of terminating an optical fiber, said method including the steps of:
inserting an end portion of an optical fiber, which comprises a core and cladding disposed about the core, into a longitudinally extending passageway of a plug having a longitudinal axis;
locating the intersection of the periphery of the plug and a line which extends radially from a longitudinal axis of the plug through a centroid of the core of the optical fiber; and
providing the plug with orienting means having a predetermined orientation with respect to the radially extending line so that when two of the plugs are supported with the longitudinal axes thereof being coaxial, the orienting means of the two plugs are adapted to be held to cause the radially extending lines to be disposed in a common plane which originates at and which extends radially from the longitudinal axes to cause the cores of the optical fibers to be disposed substantially in the common plane.

15. The method of claim 14, which also includes the step of mounting each plug in a connector body and said step of providing the plug with orienting means includes the step of providing the connector body with orienting means.

16. The method of claim 15, wherein each plug has a cylindrical cross-section and is assembled to a cylindrical connector body and said method includes the step of installing a pin in a radial direction from the longitudinal axis of the plug assembled therewith, the pin being assembled to the connector body to cause the pin to be disposed in the direction of the radially extending line of the plug.

17. The method of claim 16, wherein the angle between a reference axis and the radially extending line through the intersection for each plug is determined and wherein a pin is assembled to each connector body with the pin of the connector body displaced by the same angle from the reference axis.

18. The method of claim 16, which also includes the step of securing each connector body within a housing which is adapted to be connected to a coupler in which is received the plug.

19. The method of claim 18, wherein the coupler includes a sleeve adapted at each end to receive a plug, the plugs adapted to be supported in the sleeve with their end faces in a predetermined spatial relation to each other, and the assembling of the connector bodies with the coupler causes the pins of the connector bodies to be received in aligned slots at ends of the coupler when the plugs are received in the sleeve to cause the pins and the centroids of the fiber cores to be disposed in the common plane.

20. A method of terminating two optical fibers for connection, said method including the steps of:
(a) inserting an end portion of an optical fiber which includes a core and a cladding disposed about the core into a passageway of a first plug having a longitudinal axis and an end portion of another optical fiber into a passageway of a second plug having a longitudinal axis;
(b) assembling the first plug with a first connector body and the second plug with a second connector body;
(c) illuminating the core of the optical fiber in the first plug and locating the centroid of the optical fiber core of the first plug in an end face of the first plug;
(d) causing the first plug to be rotated about its longitudinal axis through an angle of 180°;
(e) illuminating the core of the optical fiber in the first plug and locating the centroid of the fiber core in the end face of the first plug after the first plug has been rotated 180°;
(f) locating the longitudinal axis of the first plug;
(g) locating the intersection of a line which extends radially from the longitudinal axis of the first plug and the periphery of the first plug and which passes through the location of the centroid of the rotated position of the optical fiber core of the first plug such that the core in the rotated position of the first plug is disposed between the intersection and the longitudinal axis of the first plug;
(h) assembling a pin with the first connector body such that the pin extends from the first connector body and is aligned with the intersection;
(i) locating an intersection of a radially extending line and the periphery of a second plug in accordance with the steps set forth in (c)-(g); and
(j) assembling a pin with the second connector body such that the pin extends from the second connector body and is aligned with the peripheral intersection of the second plug, the connector bodies adapted to be mounted in a coupler with the plugs being received in a sleeve such that the longitudinal axes of the plugs are coaxial and the pins of the connector bodies are aligned to cause centroids of the optical fiber cores in the first and second plugs to be disposed substantially in a common plane which originates at the longitudinal axes of the plugs and which extends radially through the pins.

21. The method of claim 20, which also includes the step of securing each connector body within a housing which is adapted to be connected to a coupler in which is received the associated plug, the connector bodies being mounted in said coupler in a position fixed with respect to said coupler, the plugs being inserted into the sleeve until their end faces are in a predetermined spatial relation to each other, and the pins of the connector bodies being received in aligned slots at ends of the coupler to cause the pins to be disposed in the common plane.

* * * * *